Figure 1:
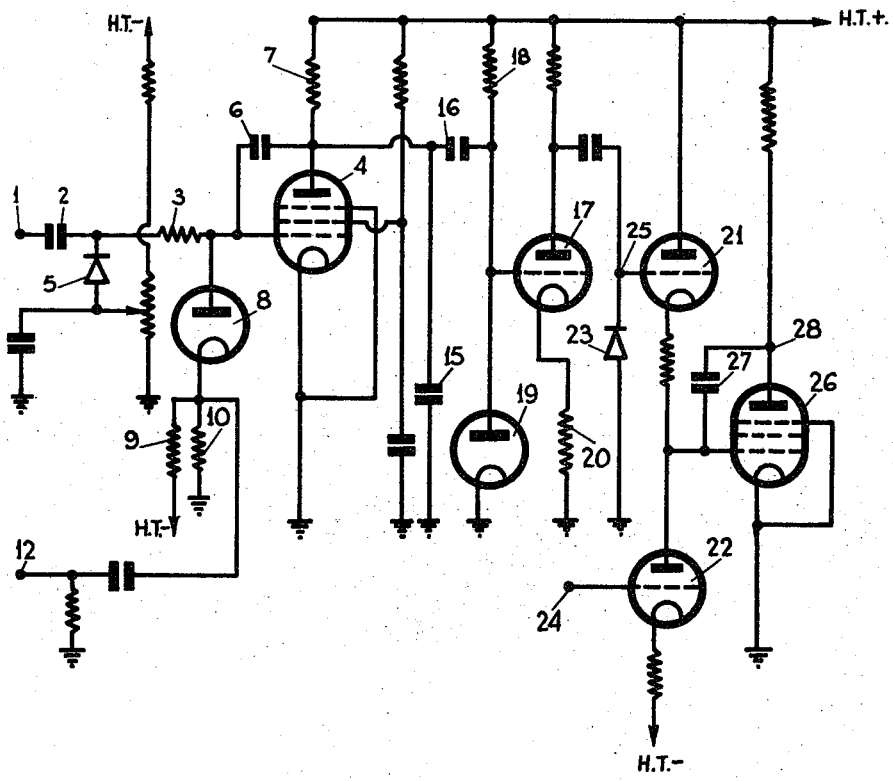

Aug. 26, 1958

C. L. HAMBLIN 2,849,706

ELECTRONIC CIRCUITS FOR DERIVING A VOLTAGE
PROPORTIONAL TO THE LOGARITHM OF THE
MAGNITUDE OF A VARIABLE QUANTITY

Filed Feb. 3, 1953

3 Sheets—Sheet 1

INVENTOR
CHARLES LEONARD HAMBLIN

BY
ATTORNEY

Aug. 26, 1958

C. L. HAMBLIN 2,849,706

ELECTRONIC CIRCUITS FOR DERIVING A VOLTAGE
PROPORTIONAL TO THE LOGARITHM OF THE
MAGNITUDE OF A VARIABLE QUANTITY

Filed Feb. 3, 1953

3 Sheets-Sheet 2

INVENTOR
CHARLES LEONARD HAMBLIN

BY
ATTORNEY

United States Patent Office 2,849,706
Patented Aug. 26, 1958

2,849,706

ELECTRONIC CIRCUITS FOR DERIVING A VOLTAGE PROPORTIONAL TO THE LOGARITHM OF THE MAGNITUDE OF A VARIABLE QUANTITY

Charles Leonard Hamblin, London, England, assignor to The General Electric Company Limited, London, England Application February 3, 1953, Serial No. 334,918

Claims priority, application Great Britain February 4, 1952

11 Claims. (Cl. 343—7.3)

The present invention relates to electronic circuits for deriving a voltage proportional to the logarithm of the magnitude of a variable quantity. One particular application of the present invention is in range-tracking equipment for a pulse radar system. Range-tracking equipment for a pulse system usually includes means for generating an index, which may be a voltage step or the edge of a voltage pulse, occurring at a time after each transmitted pulse which may be controlled. After rough alignment of the index on a selected echo pulse, the range tracking equipment may operate automatically to maintain the index in accurate alignment with the echo pulse, at the same time giving an indication of the range of the echo producing object. In a simpler form the range tracking equipment may give an indication of the misalignment of the index and an echo pulse, whereby accurate adjustment of the alignment control may be made by an operator.

It is an object of the present invention to provide a simple electronic circuit for deriving a voltage proportional to the logarithm of the magnitude of a variable quantity.

It is a further object of the present invention to provide simple and improved range-tracking equipment for use in a pulse radar system.

According to the present invention an electronic circuit for deriving a voltage proportional to the logarithm of the magnitude of a variable quantity includes, a capacitance, means for normally maintaining, in operation, the charge on the capacitance at a datum value, said means being arranged so that return to said datum value after a departure is made exponentially with respect to time, means, operating in opposition to said first mentioned means, for periodically causing the charge on the capacitance to alter from the datum value by amounts proportional to the instantaneous magnitude of the variable quantity, a smoothing circuit, an output from which is to be the required voltage, and means for applying a voltage wave derived from the voltage variations across the capacitance to the input of the smoothing circuit, said means being arranged to limit the said voltage variations effective to a predetermined range the limits of which lie at or between the voltage across the capacitance when it is charged to the datum value and the voltage across the capacitance when the charge has altered from the datum value by a predetermined minimum amount.

The variable quantity may itself be the integral over recurrent predetermined intervals of time of another quantity which is varying in time. In this case, said second-mentioned means may include an integrating circuit, means for applying a voltage proportional to said other quantity, or said other quantity itself where it is a voltage, to the input of the integrating circuit, means for rendering the integrating circuit normally inoperative but operative for recurrent equal intervals of time, equal to said predetermined interval, to cause the charge on the capacitance to alter from its datum value at each interval by an amount proportional to the integral over the interval of the voltage applied to its input.

The said second mentioned means may include a Miller integrator circuit comprising a thermionic valve including at least a cathode, an anode and a control electrode, a resistance connected between the anode of the valve and the more positive terminal of a direct current voltage source, the more negative terminal of which is connected to the cathode circuit, and a capacitance connected between the control grid and the anode of the valve, means for applying the voltage proportional to the said other quantity, or said other quantity itself if it is a voltage, to the control grid of the valve, a pulse generator, for generating regularly recurrent pulses of substantially constant duration, means for normally applying a bias voltage to a control electrode of the valve to render the integrator circuit non-operative, and means for applying the regularly recurrent pulses of constant duration equal to said predetermined interval of time, to said last mentioned means to remove the bias for the duration of each pulse and permit the integrator circuit to operate.

According to a feature of the present invention range tracking equipment for use in a pulse radar system includes means responsive to the receipt of synchronising pulses in operation for generating an index occurring at a time after each pulse transmitted from the system which may be varied over a predetermined range of time, a pair of integrating circuits each for altering the charge on a separate capacitance associated with it by an amount proportional to the time integral of the part of the echo pulse envelope occurring respectively before or after the index at each repetition of the echo pulse, separate means associated one with each capacitance for normally maintaining the charge on it at a datum value, both said means being arranged to return the charge to its datum value after an alteration according to the same exponential law with respect to time, means for applying voltage waves derived from the voltage variations across the capacitances to a differencing circuit, said means being arranged to limit the voltage variations effective to a predetermined range the limits of which lie at or between the voltage across each capacitance when it is charged to the datum value and the voltage across the capacitance when the charge on it has been altered by a predetermined minimum amount, a smoothing circuit for deriving a substantially continuous voltage from the output of the differencing circuit, and means for applying the last said voltage to control the time of occurrence of the index to tend to reduce the output of the differencing circuit to zero whereby the index is aligned substantially on the centre of the echo pulse.

The index may be the substantially coincident boundaries of a pair of pulses of equal duration, the trailing edge of one of which is coincident in time with the leading edge of the other, or is separated from it by a time which is a fraction of a single echo pulse duration. The earlier pulses of each pair may be applied to one of the pair of integrating circuits to cause it to become operative for its duration and the later pulses similarly to the other of the pair of integrating circuits.

Figure 2:
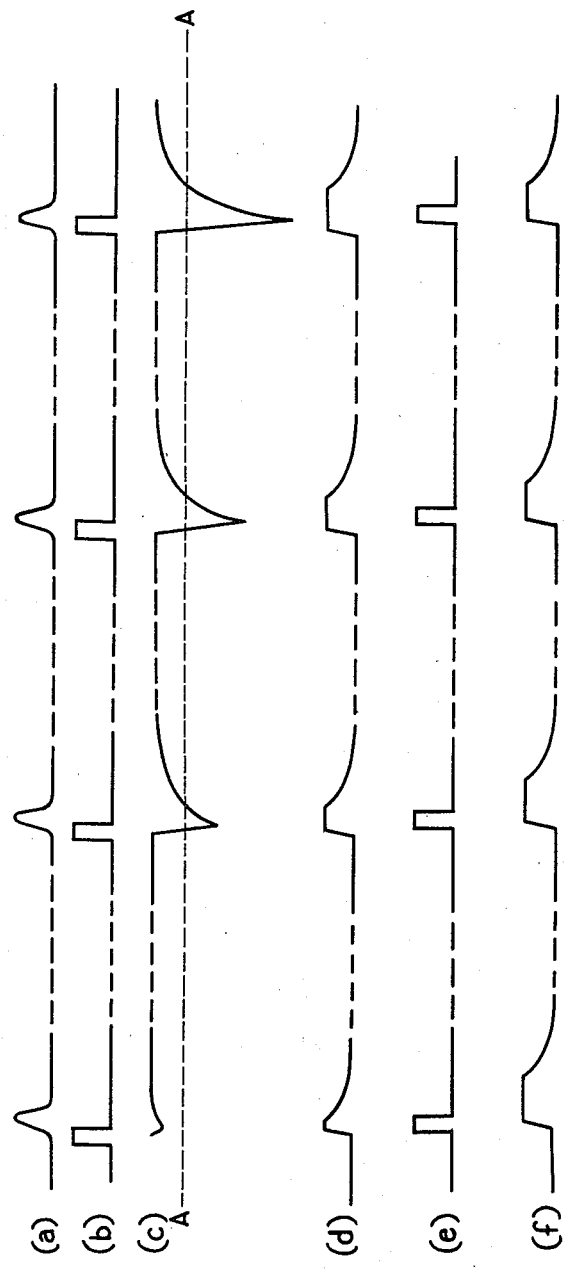
Figure 3:
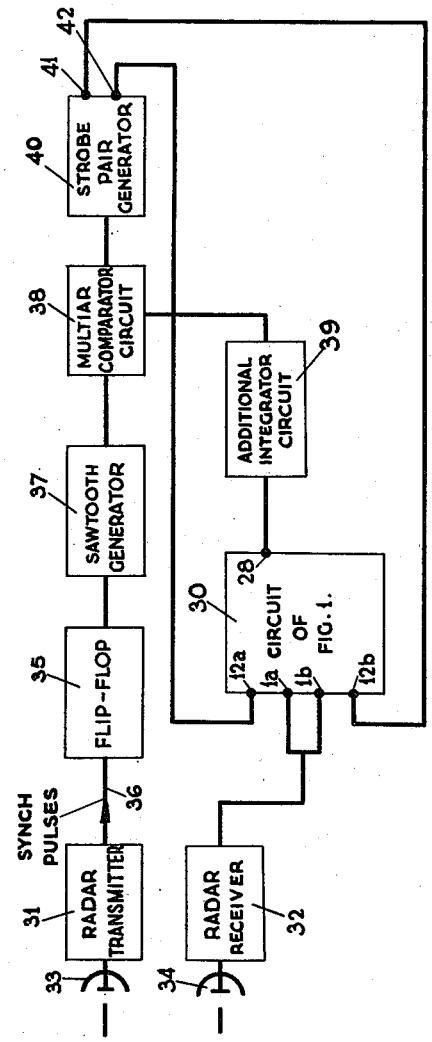

One example of range-tracking equipment in accordance with the present invention for use in a pulse radar system will now be described with reference to the accompanying drawings in which, Figure 1 shows a circuit diagram of part of the equipment, Figure 2 shows waveforms illustrating the operation of the circuit shown in Figure 1, and Figure 3 shows a block circuit diagram of the equipment and part of the radar system.

In the range-tracking equipment there is provided a pulse generator, synchronised to the transmiter of the radar system of which it is part, for generating a recurrent pair of pulses (which will be called strobe pulses in this specification) the trailing edges of the first of which coincide with the leading edges of the second. The coincident edges of each pair of strobe pulses occur at a time after each transmitted pulse which may be controlled over at least the range of time corresponding to the maximum range of the radar system. The strobe pulse generator has two separate outputs at one of which the first of each pair of pulses apears and at the other of which the second of each pair of pulses appears.

Range-tracking of an echo pulse is carried out by maintaining the coincident edges of the pair of strobe pulses, coincident with the centre of the echo pulse. This is effected automatically when required by determining at each repetition of the echo pulse, the area of it that lies within the duration of each of the two strobe pulses, and deriving a voltage proportional to the difference of logarithms of the two areas. Assuming the echo pulse to be symmetrically shaped, the derived voltage will be zero when the areas are equal and the coincident edges are aligned on the centre of the echo pulse. If the coincident edges are aligned on the centre of the echo pulse the derived voltage will be zero. If the coincident edges are not so aligned, the derived voltage will be other than zero. The derived voltage is applied to the strobe pulse generator to control the time of occurrence of the coincident edges of the pairs of strobe pulses, and adjust them to a position in which they are correctly aligned on the centre of the echo pulse and the derived voltage is reduced to zero. It will be appreciated that in this equipment the derived voltage is dependent upon the ratio of the two parts of the echo pulse and not the difference, and hence within limits is substantially independent of any variation in echo amplitude which may occur. This results in much smoother tracking, since the response characteristic of the system is independent of echo amplitude, and also enables better discrimination against noise to be obtained.

Referring now to Figure 1 of the accompanying drawings, a positive-going video signal from the output stages of the radar system receiver is applied across the input terminal 1 and earth. A coupling capacitor 2 and a resistor 3 are connected in series between the terminal 1 and the control grid of a pentode thermionic valve 4. The direct current level of the signal applied to the control grid of the pentode 4 is maintained constant by a conventional direct current level restoration circuit including the germanium crystal rectifier 5 the emitter electrode of which is connected to the common terminal of the capacitor 2 and the resistor 3 and the collector electrode to a point on a potentiometer chain at a few volts negative with respect to earth, the actual voltage being the cutoff voltage of the pentode 4.

The pentode 4 with its associated components forms a Miller integrator circuit, a small capacitor 6 being connected between its control grid and anode, and an anode load resistor 7 between the anode and the positive H. T. voltage supply lead. The anode of a diode 8 is connected to the control grid, the cathode of the diode 8 being connected to the common terminal of two resistors 9 and 10. The other terminal of the resistor 9 is connected to a source of negative D. C. potential, and that of resistor 10 to earth. It is thus arranged that the cathode of the diode 8 is maintained at a potential of about 10 volts negative with respect to earth. The diode 8 is normally conducting and the negative bias consequently applied to the control grid of the pentode 4 is arranged to be sufficient to bias it beyond cut off.

One output from the strobe pulse generator (which is not shown in Figure 1), say that consisting of the first or "early" pulses of each pair, is applied in the form of positive going voltage pulses across the terminal 12 and earth. When a strobe pulse occurs it lifts the potential of the cathode of the diode 8 above that of the anode, rendering the diode 8 non-conducting and removing the negative bias from the control grid of the pentode 4, and allowing the integrator circuit, of which the pentode 4 forms part, to operate for the duration of the strobe pulse. If during that time an echo signal or part of one appears at the terminal 1, the anode potential of the pentode 4 will drop rapidly by a voltage proportional to the integral with respect to time of that part of the echo pulse envelope occurring during the strobe pulse concerned.

A capacitor 15 is connected between the anode of the pentode 4 and earth. Whilst the pentode 4 is non-conducting this is charged substantially to the full H. T. (high tension) potential which is applied to the positive H. T. voltage supply line. When the pentode 4 conducts, on the application of a strobe at the terminal 12, and the anode potential consequently falls by an amount proportional to the area of the echo pulse occurring within the duration of the strobe pulse, the capacitor 15 is partially discharged by the current flowing in the pentode 4 by an amount proportional to the said area. After the end of the strobe pulse, the pentode 4 becomes non-conducting again and the potential across the capacitor 15 rises exponentially toward the potential of the H. T. voltage supply line, as the capacitor 15 recharges through the resistor 7. The time constant of the recharging circuit is chosen to be approximately one sixth of the pulse repetition period of the radar system so that recharge is substantially complete by the time of occurrence of the succeeding strobe pulse, for the largest possible discharge which may occur in operation.

The operation described above is illustrated by the waveform in Figure 2(a)–(c). Figure 2(a) represents four repetitions of a steady echo pulse at a constant range from the radar transmitter. In each case only the part of the signal occurring near the time of occurrence of the echo pulse is shown so that neither the ground wave nor any other echo pulses which may be received during the same scanning intervals are shown. Figure 2(b) shows the output from the strobe pulse generator and it is assumed that the time position of the trailing edge of the pulses, which are coincident in time with the leading edges of the pulses from the other output, is successively adjusted to approach and in the fourth case coincide with, the centre of the echo pulse. Figure 2(c) shows the waveform across the capacitor 15 in each of the four cases, the voltage initially falling by an amount proportional to the area of the echo pulses of Figure 2(c) occurring within the duration of the corresponding strobe pulse of Figure 2(b). The voltage across the capacitor 15 returns to its datum value in each case according to the exponential law determined principally by the values of the resistor 7 and the capacitance 15.

The voltage pulses appearing across the capacitance 15, are limited at a constant level for example that indicated by the line A—A in Figure 2(c), in the succeeding stage of the circuit. Thus a coupling capacitor 16 is connected between the side of the capacitance 15 which is not earthed, and the control grid of a triode thermionic valve 17. The control grid of the triode 17 is also connected to one end of a resistance 18 the other end of which is connected to the positive H. T. (high tension) voltage supply line, and to the anode of a diode 19, the cathode of which is earthed. The triode 17 is otherwise conventionally connected as an amplifier and has a cathode bias resistor 20 connected between its cathode and earth.

The diode 19 and the resistor 18 together establish the direct current level at the grid of the triode 17, and in other words the potential at the base line of the pulses of Figure 2(c) as applied to the control grid of the triode 17. The cut-off level A—A is determined by the permanent bias provided by the bias resistor 20, the valve 17 being cut-off when the pulse voltage falls below the level A—A. The width of each pulse appearing at the anode of the triode 17, as shown in Figure 2(d), at the cut-off level is proportional to the logarithm of the peak voltage from which the exponential recovery of the corresponding pulse of Figure 2(c) starts. The area of the tails of the pulses occurring after the end of the limited portion are constant, and the area of the parts of the pulses occurring before the end of the limited portion are proportional to the width of the pulse at the cut-off level. Thus the area of each pulse is apart from a constant term, proportional to the logarithm of the voltage stroke at the corresponding discharge of the capacitor 15. But the voltage stroke is itself proportional to the area of the echo pulses (Figure 2(a)) occurring within the duration of the strobe pulses (Figure 2(b)), so that the area of each pulse is proportional to the logarithm of the area of the corresponding echo pulse occurring within the duration of the strobe pulse. It will be noticed that the first pulse in Figure 2(c) does not reach the cut-off line A—A, the area of the pulse of Figure 2(c) falling within the strobe pulse being too small. In general the level A—A will be set to discriminate against the generally occurring noise, and prevent the tracking equipment from locking on spurious targets, or being interfered with by noise.

The output from the anode of the triode 17 which is illustrated by the waveform in Figure 2(d) is applied to the control grid of another triode 21 which forms with the triode 22 a differencing circuit. A germanium crystal rectifier 23 is connected between the control grid of the triode 21 and earth to provide restoration of the D. C. level at that point.

The control grid of the triode 22 is shown connected to a terminal 24. The terminal 24 is connected to a similar circuit to that which has been described above and is connected to terminal 25 in the control grid circuit of the triode 21. One difference is that the second or "late" ones of each pair of strobe pulses, the leading edges of which coincide in time with the trailing edges of the early strobe pulses shown in Figure 2(b), are applied at the terminal corresponding to terminal 12. These are illustrated in Figure 2(e). The pulses applied at the terminal 24 are illustrated in Figure 2(f), and as in the case of the pulses of Figure 2(d) each has an area proportional to a constant plus the logarithm of that part of the area of the corresponding echo pulse of Figure 2(a) occurring within the duration of the strobe pulses of Figure 2(e). In addition the anode circuits of the valves in the circuit are earthed and the cathode circuits are connected to a negative H. T. voltage supply line. In an alternative arrangement, the similar circuit has the anode circuits connected to a positive H. T. voltage supply line, but includes an additional thermionic valve stage for inverting the output pulses, the outputs from the two circuits being applied directly to the succeeding stage.

A further Miller integrator, including the pentode 26 connected in conventional manner, has its control grid connected to the anode of triode 22. The capacitance 27 connected between the anode and control grid of the pentode 26 is relatively high e. g. of the order of 1 µf. The voltage appearing at the anode of the pentode 26 will be a voltage proportional to the time integrated difference of the areas of the pulses applied to the control grids of the triodes 21 and 22, and hence is a voltage proportional to the difference of the logarithms of the parts of the areas of each echo pulse occurring within the durations of the two corresponding strobe pulses that is the logarithm of the ratio of the two areas. Since the capacitance 27 is relatively high a smooth voltage variation will occur at the anode of the pentode 26, varying in accordance with the time integral of the logarithm of the ratio of the areas of the two parts of the echo pulse. This voltage appearing across the output terminal 28 and earth is utilised to maintain the coincident edges of the stroke pulses automatically aligned on the centre of an echo pulse, the time control of the strobe pulse generator being automatically adjusted in accordance with the magnitude of any variation of the voltage from the datum value corresponding to alignment, until alignment is attained and the voltage restored to its datum value. In practice it may be desirable to have more than a single integrating stage for deriving the output voltage from the areas of the difference voltage pulses appearing at the output of the differencing circuit.

Figure 3 of the accompanying drawings shows a block diagram of the range tracking equipment as a whole and the relevant parts of the main radar system, showing in particular the connections to the circuit of Figure 1, which is represented by the single block 30 in Figure 3. The terminals marked 1a and 12a in Figure 3, correspond to the terminals 1 and 12 in Figure 1, and the terminals 1b and 12b to the corresponding terminals on the similar circuit which is connected to the terminal 24 in Figure 1. The terminal 28 corresponds to the terminal 28 in Figure 1.

The parts of the main radar system shown, include a radar transmitter 31 and receiver 32, together with separate parabolic transmitting and receiving aerials 33 and 34, the aerials being represented only diagrammatically. Synchronising ("synch") pulses from the transmitter 31, are applied to a conventional flip-flop circuit 35 over the lead 36. The flip-flop circuit 35 generates a positive-going rectangular pulse on each occasion of transmitting a pulse from the transmitter 31, lasting from the time of transmission of the pulse up to the maximum range of the system at which ranging may be carried out. These positive pulses are applied to a Miller integrator type sawtooth generator 37, which generates sawtooth voltage pulses having linear falling voltage strokes lasting for the duration of each applied pulse.

The output from the sawtooth generator 37 is applied to a multiar comparator circuit 38, together with the output from an additional integrator circuit 39, which is coupled to the output terminal 28 of the circuit 30. The comparator circuit 38 generates a short pulse on each occasion that the applied sawtooth voltage equals the output voltage from the integrator circuit 39.

The integrator stage in the circuit 30 and the additional integrator circuit 39 together form a servo amplifier, the output from which is a voltage representing present index range. This is fed to a feed-back loop including a comparison arrangement which generates an error voltage representing the difference of the index range and the target range, which is fed to the input of the amplifier. In operation the system adjusts itself until the error voltage is substantially zero.

The short pulses from the multiar circuit 38 are applied to the input of a strobe pair generator 40, which generates in response to each applied pulse a pair of strobe pulses, the trailing edge of the first of which coincides in time with the leading edge of the second. The earlier pulses appear at the terminal 41 and the later ones at the terminal 42, the terminals 41 and 42 being connected to the terminals 12a and 12b respectively of the circuit 30. In addition a further output (not shown in the drawing) from the multiar circuit 38 may be fed to a further single strobe generator, which generates brightening strobe pulses, for example, for indicating the target being tracked, on a cathode ray tube indicator.

In the circuit described with reference to Figures 1 and 2 of the accompanying drawings, owing to the particular application, a voltage dependent on the value of the logarithm of a variable quantity is not derived independently, since by including the differencing circuit (triodes 21 and 22), a voltage corresponding to the difference of the logarithms of two variable quantities is derived. It will be appreciated that in a simpler application the output pulses at the anode of the triode 17 might be applied directly to a smoothing circuit, the output of which would be, apart from a constant direct current component, proportional to the logarithm of the variable quantity.

Again in the simpler applications a continuous voltage wave proportional to the magnitude of a variable quantity might be applied across the input terminal 1 and earth, and regularly recurrent pulses applied across terminal 12 and earth from a simple pulse generator. The capacitance 15 would then be discharged at each pulse, by an amount proportional to the time integral of the voltage wave during each pulse. Alternatively the pulses applied at terminal 12 might be made of very short duration and the circuit of the valve 4 modified so that at each pulse the capacitance 15 is discharged by an amount proportional to the value of the voltage during the pulse. In the two cases just described the output voltage would be in the first case proportional to the logarithm of the time integral of the voltage wave coincident with the pulses and in the second case proportional to the logarithm of the voltage wave.

I claim:

1. An electronic circuit for deriving a voltage proportional to the logarithm of the magnitude of a variable quantity, including, a capacitance, means for normally maintaining in operation the charge on said capacitance at a datum value, said means including a resistance and a charging path for said capacitance through the resistance such that any return to the datum value after a departure is made exponentially with respect to time, means, operating in opposition to said last-mentioned means, for periodically causing the charge on the capacitance to alter from the datum value by amounts proportional to the instantaneous magnitude of the variable quantity, a smoothing circuit, having input terminals and output terminals, which produces a voltage across the output terminals thereof which is proportional to the time integral of a voltage applied across the input terminals thereof, and means for applying a voltage wave derived from the voltage variations across said capacitance between the input terminals of the smoothing circuit, said means including limiting arrangements for restricting the range of voltage variations effective to one not greater than the range defined by the voltage across the capacitance when it is charged to the datum value and the voltage across the capacitance when the charge is altered from the datum value by a predetermined minimum amount, the desired voltage appearing in operation across the output terminals of the smoothing circuit.

2. An electronic circuit according to claim 1 in which said means for applying a voltage wave derived from the voltage variations across the capacitance to the input of the smoothing circuit includes a thermionic valve amplifier stage, means for applying the said wave to the input of the stage in a sense such that the voltage strokes, corresponding to alterations in charge on the capacitance away from the datum value, are negative-going, the stage having an input circuit including a direct current level restoration circuit for setting the baseline of the applied waveform at a value within the linear operating range of the amplifier stage and means for biassing the stage to cut off the peaks of the applied waveform at a level corresponding to an alteration of the charge on the capacitance by said predetermined minimum amount.

3. An electronic circuit for deriving a voltage proportional to the logarithm of the time integral over recurrent predetermined intervals of time of the magnitude of a variable quantity, including a capacitance, means for normally maintaining in operation the charge on said capacitance at a datum value, said means including a resistance and a charging path for said capacitance through said resistance such that any return to the datum value after a departure is made exponentially with respect to time, an integrating circuit having input and output terminals, means for applying a voltage varying in accordance with the magnitude of the variable quantity to the input terminals of the integrating circuit, controlling means for rendering the integrating circuit operative during the said recurrent predetermined intervals of time and inoperative at all other times, means coupling said capacitance across the output terminals of the integrating circuit so that during each of said intervals of time the charge on the capacitance is caused to alter from its datum value by an amount proportional to the integral over the said interval of the voltage applied to the input of the integrating circuit, a smoothing circuit, having input terminals and output terminals, which produces a voltage across the output terminals thereof which is proportional to the time integral of a voltage applied across the input terminals thereof, and means for applying a voltage wave derived from the voltage variations across said capacitance between the input terminals of the smoothing circuit, said means including limiting arrangements for restricting the range of voltage variations effective to one not greater than the range defined by the voltage across the capacitance when it is charged to the datum value and the voltage across the capacitance when the charge is altered from the datum value by a predetermined minimum amount, the desired voltage appearing in operation across the output terminals of the smoothing circuit.

4. An electronic circuit according to claim 3 in which said controlling means comprises, means for normally applying a control voltage to the integrator circuit to render it inoperative, a pulse generator for generating voltage pulses, the durations of which define said recurrent predetermined intervals of time, and means for applying an output from the pulse generator to overcome the said control voltage and permit the integrator circuit to operate for the duration of each pulse.

5. An electronic circuit according to claim 3 in which the integrator circuit is a Miller integrator circuit comprising a thermionic valve having at least an anode, a cathode and a control electrode, a source of direct current operating potential, a resistance connected between the anode of the valve and the more positive terminal of the said source, the more negative terminal of which is connected to the cathode circuit of the valve, an integrating capacitance connected between the control grid and the anode of the valve, and means coupling the input terminals to the control grid circuit of the valve so that the input voltage is applied to the control grid, and the said controlling means comprises means for normally applying a bias voltage to a control electrode of the valve in the integrator circuit to render it inoperative, a pulse generator for generating voltage pulses the durations of which define said recurrent predetermined intervals, and means for applying an output from the pulse generator to overcome the said bias voltage and permit the integrator circuit to operate for the duration of each pulse.

6. An electronic circuit according to claim 5 in which the said capacitance is connected between the anode of the valve and a point at a fixed potential, and is normally charged to the datum level through a circuit including the anode resistance of the integrator circuit.

7. An electronic circuit according to claim 3 in which said means for applying a voltage wave derived from the voltage variations across the capacitance to the input of the smoothing circuit includes a thermionic valve amplifier stage, means for applying the said wave to the input of the stage in a sense such that the voltage strokes, corresponding to alterations in charge on the capacitance away from the datum value, are negative-going, the stage having an input circuit including a direct current level restoration circuit for setting the baseline of the applied waveform at a value within the linear operating range of the amplifier stage and means for biassing the stage to cut-off the peaks of the applied waveform at a level corresponding to an alteration of the charge on the capacitance by said predetermined minimum amount.

8. Range tracking equipment for use in a pulse radar system, including means responsive to the receipt of synchronising pulses in operation for generating an index occurring at a time after each pulse transmitted from the system, which may be varied over a predetermined range of time, a pair of integrating circuits, a pair of equal capacitances associated one with each of the integrating circuits, means for applying the echo pulse to the inputs of the integrating circuits; means for applying the index to each of the integrating circuits to control their operation so that each alters the charge on the capacitance associated with it by an amount proportional to the time integral of the part of the echo pulse envelope occurring respectively before or after the index at each repetition of the echo pulse, separate means associated one with each capacitance for normally maintaining in operation the charge on it at a datum value, said means each including a resistance and a charging path for the capacitance through the resistance such that any return of the charge on either capacitance to the datum value after a departure is made according to the same exponential law with respect to time, a differencing circuit, means for applying voltage waves derived from the voltage variations across the capacitances to the differencing circuit, said means each including limiting arrangements for restricting the range of voltage variations effective to one not greater than the range defined by the voltage across the capacitances when they are charged to the datum value and the voltage across the capacitances when the charge is altered from the datum value by a predetermined amount, a smoothing circuit, coupled to the output of the differencing circuit, for deriving a substantially continuous voltage proportional to the time integral of the output of the differencing circuit, and means for applying the last said voltage to the index generating means to control the time of occurrence of the index to tend to reduce the output of the differencing circuit to zero whereby in operation the index is maintained in alignment substantially on the centre of the echo pulse.

9. Range tracking equipment according to claim 8 in which the index generating means comprises means for generating recurrent pairs of pulses, the trailing edge of the first of each pair coinciding in time with the leading edge of the second, and the coincident edges of the pairs of pulses constituting the index.

10. Range tracking equipment according to claim 8 in which the index generating means comprises means for generating recurrent pairs of pulses the trailing edge of the first of each pair being separated from the leading edge of the second by a time interval which is a fraction of the duration of a single echo pulse, the said time interval constituting the index.

11. Range tracking equipment according to claim 8 in which each of said means for applying voltage waves derived from the voltage variations across the capacitances to a differencing circuit includes a thermionic valve amplifier stage, means for applying the said wave to the input of the stage in a sense such that the voltage strokes, corresponding to alterations in charge on the capacitance away from the datum value, are negative-going, the stage having an input circuit including a direct current level restoration circuit for setting the baseline of the applied waveform at a value within the linear operating range of the amplifier stage and means for biassing the stage to cut off the peaks of the applied waveform at a level corresponding to an alteration of the charge on the capacitance by said predetermined minimum amount.

References Cited in the file of this patent

UNITED STATES PATENTS

| | | |
|---|---|---|
| 2,433,667 | Hollingsworth | Dec. 30, 1947 |
| 2,446,244 | Richmond | Aug. 3, 1948 |
| 2,652,490 | Levy | Sept. 15, 1953 |

FOREIGN PATENTS

| | | |
|---|---|---|
| 588,187 | Great Britain | May 16, 1947 |